United States Patent
Nishio et al.

(12) 
(10) Patent No.: US 6,244,653 B1
(45) Date of Patent: *Jun. 12, 2001

(54) RESIN MOLDED OBJECTS

(75) Inventors: Akiteru Nishio, Aichi-ken; Hiroyuki Imaizumi; Tsuneaki Iwakiri, both of Kanagawa-ken, all of (JP)

(73) Assignees: Kabushiki Kaisha Toyoda Jidoshokki Seisakusho, Kariya; Mitsubishi Engineering Plastics Corporation, Tokyo, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/156,073

(22) Filed: Sep. 17, 1998

(30) Foreign Application Priority Data

Sep. 17, 1997 (JP) ................................................ 9-252276

(51) Int. Cl.$^7$ .............................. B60J 7/043; B60J 7/04; B62D 29/04
(52) U.S. Cl. ............................... 296/216.09; 296/216.01; 296/216.06; 296/201; 296/96.21; 296/901; 52/309.1; 52/309.16
(58) Field of Search ........................ 296/216.09, 216.01, 296/216.06, 146.1, 146.15, 146.16, 201, 96.21, 901; 52/309.1, 309.16

(56) References Cited

U.S. PATENT DOCUMENTS

| | | |
|---|---|---|
| 3,970,343 | 7/1976 | Horn .................. 296/137 E |
| 4,154,474 | 5/1979 | Hough et al. ............. 296/137 B |
| 4,783,117 | * 11/1988 | Nagata ............... 296/216.09 |
| 5,046,779 | 9/1991 | Ichinose et al. ............ 296/216 |
| 5,339,584 | * 8/1994 | Ohtake et al. ............ 52/208 |
| 5,409,290 | * 4/1995 | Grimm et al. .......... 296/216.09 |
| 5,607,998 | * 3/1997 | Markusch et al. ........... 524/494 |
| 5,642,228 | 6/1997 | Takezawa et al. ........... 359/642 |
| 5,702,779 | 12/1997 | Siebelink, Jr. et al. ........... 428/14 |
| 5,721,039 | 2/1998 | Yanagihara et al. .......... 428/172 |
| 5,756,013 | 5/1998 | Yanagihara et al. ........... 264/1.7 |

FOREIGN PATENT DOCUMENTS

| | | |
|---|---|---|
| 42 04 621 A1 | 8/1993 | (DE) . |
| 58-107081 | 2/1985 | (JP) . |
| 02227319A | 9/1990 | (JP) . |
| 09048242A | 2/1997 | (JP) . |

OTHER PUBLICATIONS

Combinmelt–Technologie fur Mehrfarben und Mehrkomponentenspritzguss, KGK Kautschuk Gummi Kunststoffe, vol. 49, 7–8/96, pp. 485–486.

* cited by examiner

*Primary Examiner*—D. Glenn Dayoan
*Assistant Examiner*—Greg Blankenship
(74) *Attorney, Agent, or Firm*—Woodcock Washburn Kurtz Mackiewicz & Norris LLP

(57) ABSTRACT

A resin molded object 1 that may be used as a sunroof has a reinforcing rib 3 around the periphery of a window body 2 that is disposed inside a car. The window body 2 is molded using a fixed die 7 and one molding surface 8a of a first movable die 8, then the reinforcing rib 3 is molded on the window body 2 using the fixed die 7 and a second molding surface 8b of a second movable die 8 to thereby to fabricate a double-molded resin window.

23 Claims, 5 Drawing Sheets

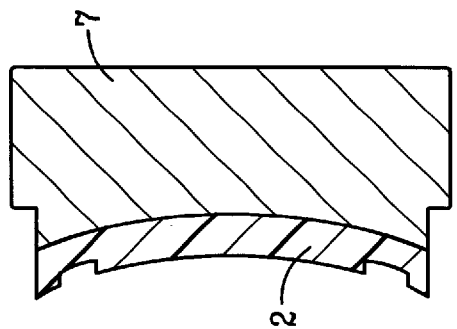
FIG. 9
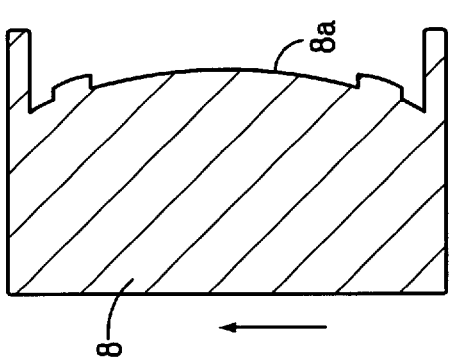
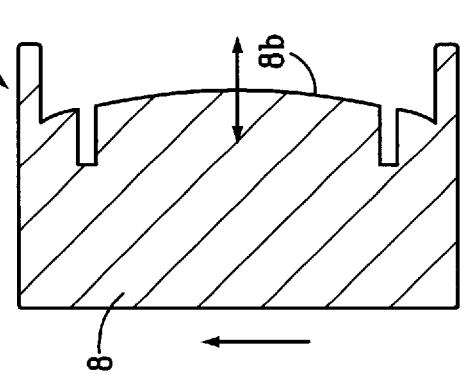
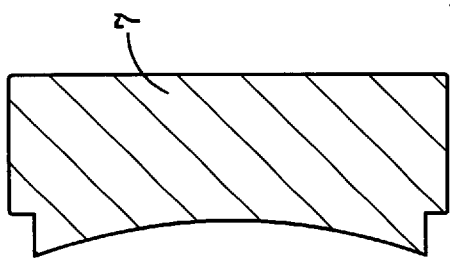
FIG. 8
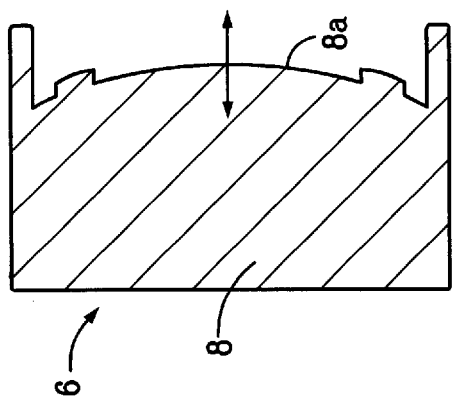
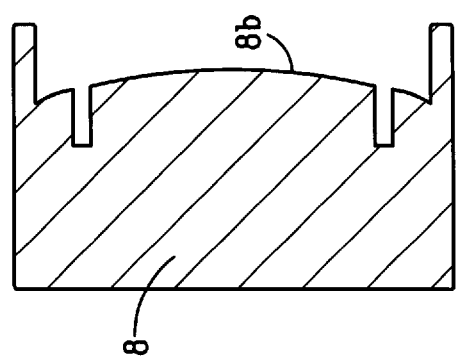

RESIN MOLDED OBJECTS

BACKGROUND OF THE INVENTION

1. Field of the Invention

The present invention relates to resin molded objects such as, for example, resin windows that can be used, for example, as a sunroof of a car, as well as methods and dies used for manufacturing such resin molded objects.

2. Description of the Related Art

Window units made of transparent resin materials that are lighter than glass have been used as sunroofs and other windows in various types of vehicles in order to replace similar glass units that are designed to allow light into the inside of the vehicle. Resin materials have been substituted for glass materials because functionally similar units are much lighter in weight and thereby allow the manufacturer to reduce the overall weight of the vehicle. Such resin windows typically have been manufactured using injection-molding techniques, and typically transparent synthesized resins, such as polycarbonate or acrylic resins, have been utilized.

However, known resin-molded windows have been subject to problems because the resin material does not provide sufficient rigidity against bending and twisting. Reduced rigidity in comparison to similar glass window units results because the elastic modulus of resin is lower than that of glass.

One known technique for overcoming this rigidity problem is to provide an integrally formed reinforcing rib 12 around the periphery of the window body on the inside surface of the window unit, as shown in FIGS. 21 and 22. When such a reinforcing rib 12 is formed, however, sink marks are known to appear on the surface of the window body 11 corresponding to the rib-formed portion, as a result of the injection molding manufacturing process used to fabricate such resin window units. Thus, when reinforcing the resin window unit to increase rigidity, another problem, namely the external appearance of the window is spoiled, is created. Consequently, when the total size of the window is large and/or when the external appearance of the window is a matter of great importance, such resin-molded objects can not be reinforced with such a rib 12.

In addition, known resin window units have been designed with a reinforcing member 13 made of steel, aluminum, or the like. In such a case, the reinforcing member 13 effectively reinforces the window in conjunction with the rib 12. However, this design increases the weight of the resin window unit and minimizes the reduced weight advantage that resin window units have over glass window units.

SUMMARY OF THE INVENTION

Therefore, it is one object of the present invention to overcome such problems with known window units.

Preferably, an improved resin molded object is constructed using two components. The first component is a main body. In preferred aspects of the present teachings, the main body is a window having a generally smooth surface and is generally transparent to light, although shading may optionally be provided. The first component has a portion for joining a second component, which second component preferably is a reinforcing piece. This reinforcing piece preferably protrudes from the molded body when the first and second component are assembled together in a manner that provides additional rigidity to the main body. The process for assembling the first and second components is preferably a two step injection molding process, although other assembly processes may be utilized.

Preferably, both components are constructed from a resin material, although any lightweight and generally transparent material will be appropriate. In addition, the first and second components may be constructed from the same or different materials. Further, the attaching structure for joining the two components into a single unit is not particularly limited as long as a reliable, secure fit is provided. Preferred attaching structure designs are described further below.

In a second aspect of the present teachings, the appearance of sink marks on the surface of the main body opposite of the protruded member formed surface can be prevented, because the main body can be fabricated independently of the protruded member. Therefore, resin material objects, and in particular resin window units, having an attractive external appearance can be prepared.

In a third aspect of the present teachings, the window unit preferably is constructed using a two step process. In the first step, either the first component, such as an object body, or the second component, such as a protruded member, is formed using a fixed die and a first movable die. In the second step, the component that was not formed in the first step is formed using the fixed die and a second movable die. Preferably, the component formed in the second step is molded within or around the other component so that the two components do not require any additional steps to assemble the first and second components. However, additional steps may be utilized in the fabrication and assembly process, if desired.

Further, dies that can be utilized to prepare resin window units are taught in a fourth aspect of the present teachings. Preferably, the dies include a fixed die, a first movable die and a second movable die. The first movable die has a first molding surface corresponding to one component of the resin molded object formed in the first step described above and the second movable die has a second molding surface corresponding to the other component formed in the second molding process. The first and second molding surfaces can be constructed to be as opposite sides of the same movable die, and each of these two molding surfaces will oppose the fixed die during each respective step of the molding process. This die design permits the manufacturing cost of the dies to be reduced over designs that utilize two separate movable dies, because the molding surface of the movable die can be rotated or flipped over to the other side with respect to the fixed die. Thus, a resin molded object can be formed in double molding using one molding machine. However, techniques for constructing improved resin molded objects using two separate movable dies are also taught.

Additional objects, features and advantages of the present invention will be understood by reviewing the detailed description of the invention and the claims in conjunction with the drawings.

BRIEF DESCRIPTION OF THE DRAWINGS

FIG. 8 illustrates a representative process for molding a resin window and the steps for changing the dies in a process for molding the window body.

FIG. 9 illustrates a representative process for molding the resin window and the steps for changing the dies in the process for molding the reinforcing rib.

DETAILED DESCRIPTION OF THE INVENTION

Figure 1:
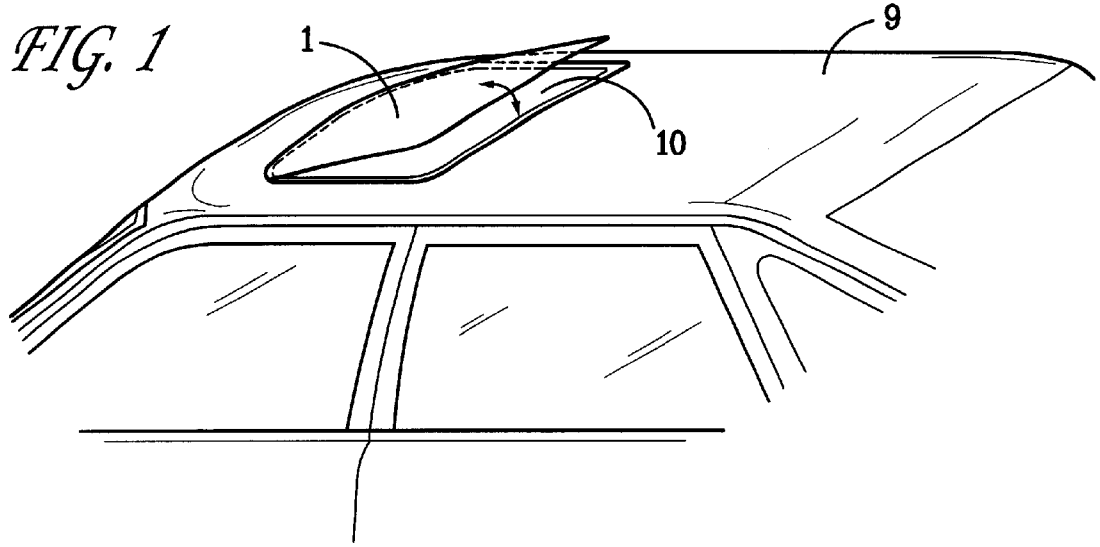
FIG. 1 is a perspective view of a car having a sunroof.

In a preferred aspect of the present teachings, an improved resin molded object is taught that is constructed from two components. The present teachings are particularly applicable to resin molded objects having a structure that would benefit from the inclusion of a reinforcing structure within the design, wherein inclusion of such a reinforcing structure using known molding techniques would result in defects in the appearance of the resin molded object. By utilizing two components having adjoining portions for attaching the two components, wherein one of the components is a structure that would benefit from reinforcement and the other component is a reinforcing structure, the overall rigidity of the resin molded object can be improved over resin molded objects that are integrally fabricated and without damaging the external appearance of the resin molded object.

Preferably, the component in need of reinforcement is a window body that is at least marginally transparent to light. The window body however may range from being completely clear and colorless to shaded and even possibly partially or fully opaque. The second component that is utilized to reinforce the first component may also be transparent to light. However, transparency also is not a requirement for the second component. Both components are constructed from the same lightweight resin material, although different materials may be utilized in appropriate situations. Preferably, the reinforcing component has been fortified with a glass fiber element to increase the rigidity of the reinforcing component.

Various treatments of the first and/or second components optionally may be provided to improve the properties of the finished resin product, such as surface hardness, dust proofing, charging prevention, reflection preventing, light diffusion, resistance to weather, heat radiation blocking, etc. Such treatments may be performed either while the resin molded object is being formed within a die or after the resin molded object has been formed. In addition, artistic coatings may be applied to the resin molded object to create, for example, a designed layer, or an embossed layer. Such artistic coatings may also be formed freely at any place, in any size, in any order and on any side of the resin molded object.

The resin molded object preferably may be constructed using a double-molded structure, wherein a protruded (reinforcing) member fits within a concave (adjoining) portion of the object body. Such an adjoining structure provides the advantage of increasing the contact area between the object body and the protruded member and is thus effective in improving the connecting strength.

However, a variety of adjoining structures may be used to attach the first and second components of the resin molded objects. For example, the base of the protruded member can fit in a concave portion formed in the object body or a convex portion can be formed on the object body that permits a concave portion formed in the base of the protruded member to be formed therein. Additionally, a plurality of convex portions can be formed side by side on or within the object body to fit together with a plurality of convex portions on the protruded member. In this manner, the convex portions are jointly secured to the protruded member by a wrapped attaching structure.

Further representative attaching structures are shown in FIGS. 10–20 and are described further below. These attaching structures are merely intended to be representative examples of preferred attaching structures and are not intended to limit the scope of the teachings in any way.

Naturally, if the resin-molded object is a resin window and the window includes a reinforcing rib or a mounting boss, the rib-formed or the boss-formed portion can be double-molded to produce a resin window unit that is free of sink marks. In this case, various connecting structures may be utilized to provide, for example, a convex-concave fitting of the reinforcing rib or the mounting boss and the window body. In one representative example, the base of the reinforcing rib or the mounting boss fits within a concave portion formed in the window body or a convex portion formed within the window body can be fit into a concave portion formed at the base of the reinforcing rib or the mounting boss. In addition, a plurality of convex portions formed side by side on the window body can be fit within the reinforcing rib or the mounting boss so as to reliably and securely attach the two components.

While the reinforcing or protruded member is preferably made from the same resin material as the object body, the reinforcing component and/or the object body can also be manufactured from a resin that includes at least one or more type(s) of glass fillers, including for example glass fiber, glass beads, glass balloons, glass flakes, or mild fiber. If the object body and the protruded member both contain the same reinforced resin material, both the protruded member and the object body can be further reinforced.

Preferably, the resin-molded objects disclosed herein are fabricated using a double molding process. In such a preferred double molding process, one component is first molded. This component can be either the main object body or the reinforcing component. The order that the components are formed is not essential. After the first component is formed to include an adjoining portion, the second component is molded to fill in the adjoining portion and thereby attach the first and second components.

Preferably, such methods for forming resin molded objects utilize a fixed die, a first movable die and a second movable die. In the first step, the first component is formed by placing the fixed die and the first movable die in position and injection molding a liquid resin material. Once the resin material has cured to form the first component, the first movable die is removed and replaced with the second movable die. This second movable die has a different shape from the first movable die and provides a space for forming the second component by injection molding.

The finished resin molded object includes two separate components, namely an object body and a protruded member projecting from the object body, but the two components are combined as a single unit, for example, by chemical bonding of the two components or by a simple physical connection that results from the complementary shapes of the two components. The type of attachment is not particularly essential. The molding process also can be performed so that a portion of one of the two components is molded such that the molded part is wrapped by another piece of the object that is molded in the second step of the molding process.

The methods for molding resin molded objects are not limited to the preferred injection molding techniques described above and below. Other methods may be utilized, such as injection and compression molding, and the like. For example, in a further representative example, a thermal plastic resin film or sheet can be fit within the cavity of a set of injection molding dies, and liquid or melted thermal plastic resin can be introduced into the cavity by various means to thereby laminate the injected resin on the film or sheet in a unitary manner.

A preferred set of dies is taught for use in fabricating the resin molded objects described herein. These dies may be optionally utilized to prepare the described resin molded objects or to practice the preferred methods of fabrication. Such preferred dies may include a fixed die, a first movable die and a second movable die. The first movable die preferably has a first molding surface corresponding to one component of the object molded in a first step of a molding process and the second movable die has a second molding surface corresponding to the other component formed in a second step of the molding process. The first and second molding surfaces preferably are both designed to conform to the shape of the fixed die and the first and second molding surfaces may be disposed on opposite sides of a single moveable die.

Each of the additional features and method steps disclosed above and below may be utilized separately or in conjunction with other features and method steps to provide an improved resin molded object, and preferably to prepare a window unit that is capable of being installed as a sunroof structure. Representative examples of the present teachings, which utilize many of these additional features and method steps in conjunction, will now be described in detail with reference to the drawings. This detailed description is merely intended to teach a person of skill in the art further details for practicing preferred aspects of the present teachings and is not intended to limit the scope of the protection. Only the claims define the scope of the protection. Therefore, combinations of features and steps disclosed in the following detail description may not be necessary to practice the present teachings in the broadest sense, and are instead taught merely to particularly describe a preferred embodiment of the teachings.

Figure 2:
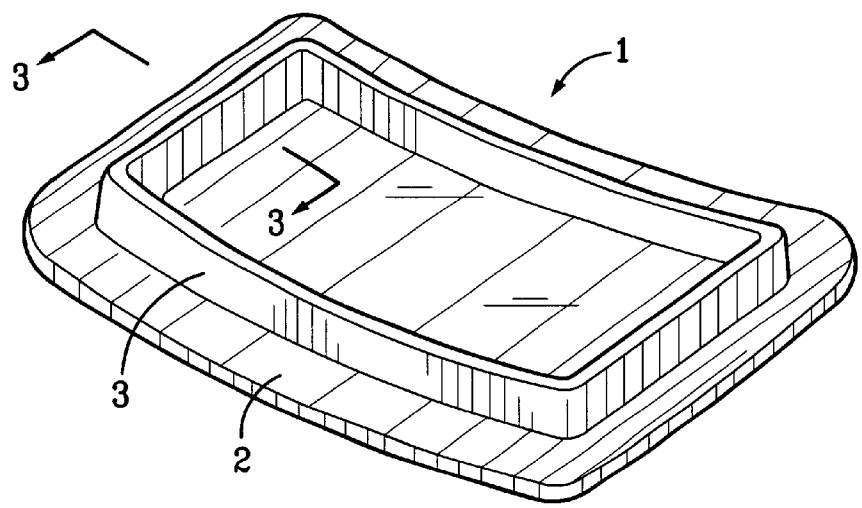
FIG. 2 is a perspective view of a representative example of a resin window prepared according to the present teachings.
Figure 3:
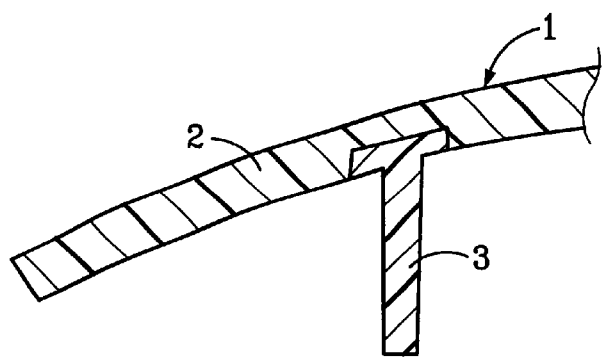
FIG. 3 is a cross sectional view along the line 3—3 shown in FIG. 2.

Preferably, a resin window 1 in this first representative embodiment is installed in a car as a sunroof structure 10 within the roof panel 9 of the car as shown in FIG. 1. As shown in FIGS. 2 and 3, the resin window 1 is formed as a window body 2 (object body) having a rectangular shape and is preferably made of a transparent polycarbonate resin. A reinforcing rib 3 is preferably formed from a polycarbonate resin that contains glass fibers for additional reinforcement. This reinforcing rib 3 is also referred to herein as a protruded member. The window body 2 and the rib 3 are connected as a single unit, preferably by a double-molding process.

The reinforcing rib 3 preferably is formed along the entire outer periphery of the window body 2 within a range that will not impair sunlight entering the car. This reinforcing rib 3 serves to improve the overall rigidity of the window body 2. Both surfaces of the window body 2, i.e., inside and outside of the car, should preferably be covered with a hard coating film (not illustrated) to prevent or reduce the possibility of scratches or to add optional features, such as antenna printing, black-out, shading, etc., to the car.

If the window body 2 and the reinforcing rib 3 are made of the same material, the two components can by unitarily connected to each other by means of chemical bonding during the molding process. In this representative embodiment, the reinforcing rib 3 is formed roughly in a T shape to increase the connecting area between both items. Thus, the base of the rib 3 is structured so as wrap around the adjoining portion of the window body 2. That is, the protruded rib 3 can fit within the recess of the window body 2 as shown in FIG. 3.

Figure 4:
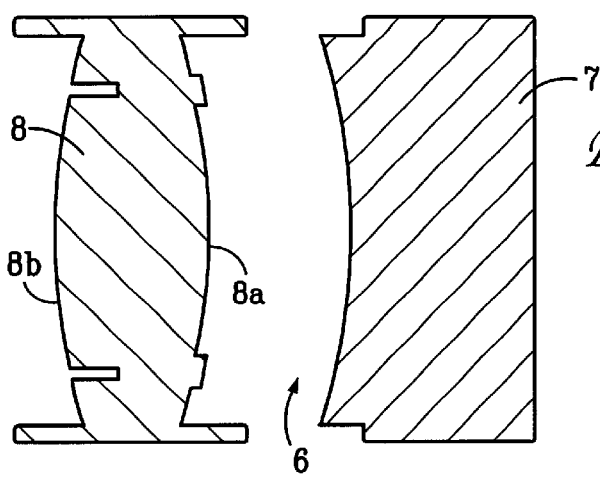
FIG. 4 illustrates a representative set of dies that can be utilized according to the present teachings for molding resin window.

The resin window 1 preferably is manufactured by injection double-molding using the dies 6 as shown in FIG. 4 and an explanation will be made for how to mold the resin window 1, as well as to manipulate the dies 6. The dies 6 shown in FIG. 4 are of a vertical type and include a fixed die 7 (core side) for forming the outside shape of the window body 2 and a two-cavity movable die 8 (8a and 8b) having two molding surfaces for forming the inside shape of the window body 2 (using die 8a) as well as the reinforcing rib 3 (using die 8b).

Preferably, the two molding surfaces are formed on the opposite sides of a single die unit; however two separate die units may be utilized, if desired. The two-cavity die 8 can be rotated 180 degrees around the vertical axis. The molding surfaces 8a and 8b can also be disposed to be opposite of the molding surface of the fixed die 7, respectively.

Figure 5:
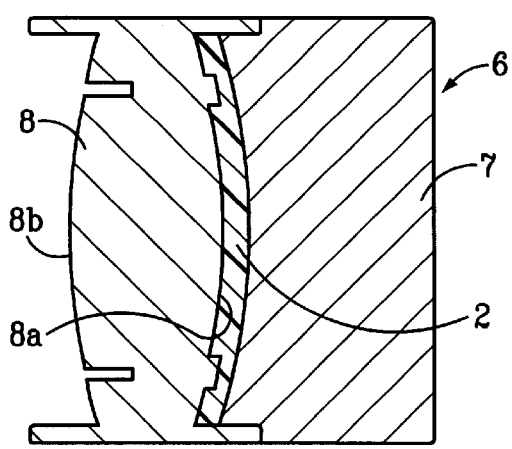
FIG. 5 illustrates a representative process for molding the window body using the dies shown in FIG. 4.

Preferably, the dies 6 are first arranged so that the first molding surface 8a of the movable die 8 is opposite of the molding surface of the fixed die 7, as shown in FIG. 4. The movable die 8 is then moved to bring the fixed die 7 into contact with the movable die 8, as shown in FIG. 5. In this case, a connecting recess is formed at the periphery of the window body 2 inside the car (where the dies are aligned). Once the dies are in this position, polycarbonate resin is injected and molded into the cavity of the dies. Consequently, the first molding step forms the window body 2, which is the object body; however, the movable die 8 can be constructed so as to form the reinforcing or protruding element first.

Figure 6:
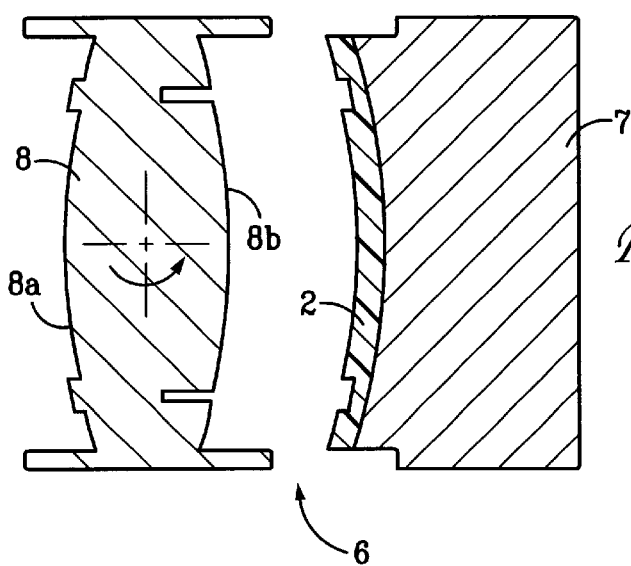
FIG. 6 illustrates a representative process for opening the dies and turning the movable die over.

After the resin has cured, the dies 6 are separated as shown in FIG. 6, and the movable die 8 is rotated or turned 180 degrees about the vertical axis, so that the second molding surface 8b faces the molding surface of the fixed die 7. During this step, the cured window body 2 is not separated from the fixed die 7, but rather remains within the fixed die 7.

Figure 7:
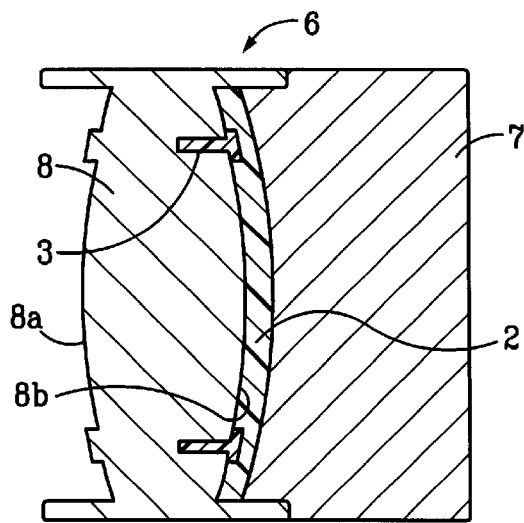
FIG. 7 illustrates a representative molding process that uses the dies for forming a reinforcing rib.

The fixed die 7 and the movable die 8 are then fastened and polycarbonate resin containing glass fiber is injected and molded in the cavity. Thus, the second molding step forms the reinforcing rib 3 (protruded member), as shown in FIG. 7. During this second molding step, the T-shape portion of the reinforcing rib 3 is fit and connected within the recess of the window body 2.

After the resin is cured, the dies are separated and the molded object is removed from the dies. Thus, the double-molded resin window 1 is manufactured so that the reinforcing rib 3 is formed at the periphery of the window body 2 inside the car as shown in the cross sectional view in FIG. 3. Because the resin window 1 is fabricated using a double-molding technique, the window body 2 is not affected by shrinkage of the molded reinforcing rib 3. In other words, this method can eliminate sink marks that are generated using known molding methods in which the window body 2 is integrally formed together with the reinforcing rib 3. Also, the resin window 1 can be manufactured according to this double-molding technique using a single molding machine, thereby minimizing manufacturing costs over a die design that utilizes two separate movable dies 8.

As a result this double-molding technique, the reinforcing rib 3 can be formed in any width or height. Further, since the reinforcing rib 3 can be formed in a sufficient size to compensate for insufficient rigidity of the window body 2, this construction can eliminate the need to use a reinforcing member made of steel, aluminum, and or other metals, which has been a requirement of known resin window units. In addition, the strength of the rib 3 can be increased using a lightweight polycarbonate resin that preferably includes glass fibers. Using this particular combination of preferred techniques, the reinforcing rib 3 projects less so the thickness of the entire sunroof housing is reduced. Thus, the weight and thickness of the entire resin window 1 can be reduced, thereby providing the advantages of reduced weight, reduced manufacturing costs and increased head clearance within the car.

Furthermore, if both the window body 2 and reinforcing rib 3 are made of the same resin material, the attachment of the two components can be as strong as the integrally formed window body and reinforcing ribs constructed using known molding methods, because the two materials can attach by chemical boding. And furthermore, if the window body 2 and the reinforcing rib 3 are fit together using a convex-concave fitting, the connection area between both members is increased and the connecting strength between the two components can be further increased.

Using known molding methods, the reinforcing rib is formed from the same material as the window body in a single injection-molding step. Therefore, the rib and window bodies have the same color and transparency. As a result, functional objects, such as hinges, links, etc., can be seen through the rib, even if the rib is embossed. In order to hide or shield these structures, a shielding member, such as a reinforcement or other decorative article, is required. According to this representative embodiment, since the molding material of the reinforcing rib 3 can be easily colored with a pigment that is different from the window body that is formed in the first molding step, the reinforcing rib 3 optionally can function as a shielding member, if desired.

A second representative method for manufacturing the resin window utilizes two separate movable molding die that can be moved sideways as shown in FIGS. 8 and 9. This molding method uses a movable die 8 for each of the two cavities needed for double-molding process and one movable die 8 provides a first molding surface 8a corresponding to the window body 2 and the other movable die 8 provides a second molding surface 8b corresponding to the reinforcing rib 3. The dies 8 are preferably disposed side by side, for example, on a sliding table.

This double-injection molding method is performed by first using the fixed die 7 and the movable die 8 (the first molding surface 8a) to form the window body 2 as shown in FIG. 8. Once the window body has cured, the movable die 8 moved, for example by means of the sliding table, so that the second injection-molding step can be performed. In this second step, the molded window body 2 (held in the fixed die 7) is aligned with the movable die 8 (the second molding surface 8b) to form the reinforcing rib 3. Thus, the double-molded resin window 1 can be manufactured according to this alternative method.

As with the first representative method, the sink mark problem that arises using known molding techniques can be solved, because the resin window 1 and the reinforcing rib 3 are formed in two separate steps.

Although the window body 2 was molded first and then the reinforcing rib 3 is molded in these representative embodiments, the molding order may be reversed. If the molding order is reversed, however, the recess (wrapping side) should preferably be molded in the second step, because shrinkage of the resin material during molding is used to firmly attach the reinforcing rib 3 to the window body 2.

Further, while polycarbonate resin containing glass fiber is used as the material of the reinforcing rib 3 in these representative embodiments, other resins containing different glass filler additives, such as glass beads, glass balloons, glass flakes, mild fiber, and the like may be used. The polycarbonate resin used in these examples is only provided as an example and other resin materials, such as acrylics, can be selected as appropriate for the type of object to be molded.

Figure 10:
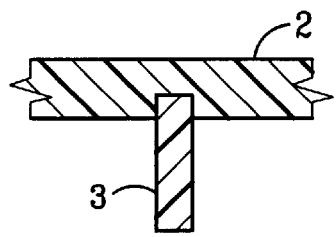
FIG. 10 illustrates a representative design for attaching the adjoining portion of the reinforcing rib to the window body.
Figure 11:
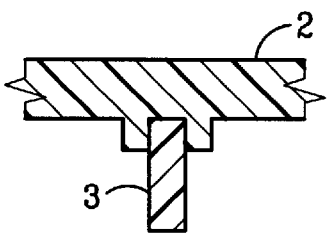
FIG. 11 illustrates a first variation of the first representative design for attaching the adjoining portion of the reinforcing rib to the window body.
Figure 12:
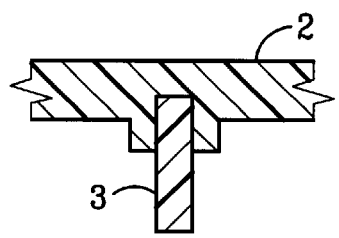
FIG. 12 illustrates a second variation of the first representative design for attaching the adjoining portion of the reinforcing rib to the window body.
Figure 13:
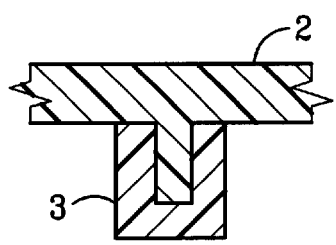
FIG. 13 illustrates a second representative design for attaching the adjoining portion of the reinforcing rib to the window body.
Figure 14:
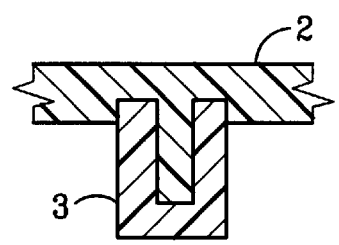
FIG. 14 illustrates a variation of the second representative design for attaching the adjoining portion of the reinforcing rib to the window body.
Figure 15:
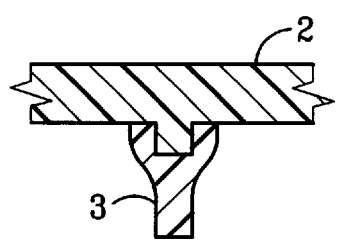
FIG. 15 illustrates third representative design for attaching the adjoining portion of the reinforcing rib to the window body.
Figure 16:
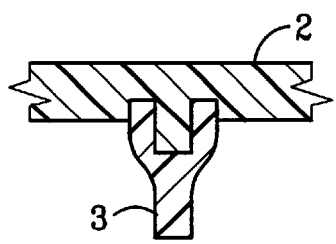
FIG. 16 illustrates a variation of the third representative design for attaching the adjoining portion of the reinforcing rib to the window body.
Figure 17:
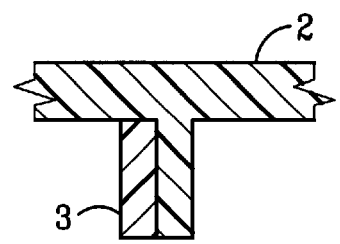
FIG. 17 illustrates a fourth representative design for attaching the adjoining portion of the reinforcing rib to the window body.
Figure 18:
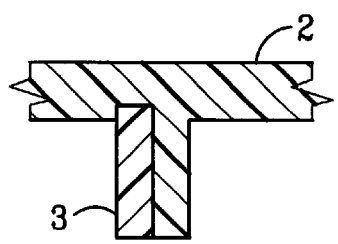
FIG. 18 illustrates a variation of the fourth representative design for attaching the adjoining portion of the reinforcing rib to the window body.
Figure 19:
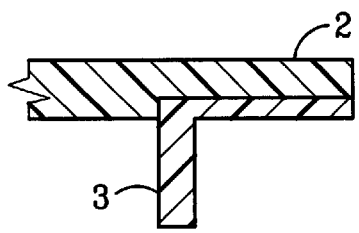
FIG. 19 illustrates a fifth representative design for attaching the adjoining portion of the reinforcing rib to the window body.
Figure 20:
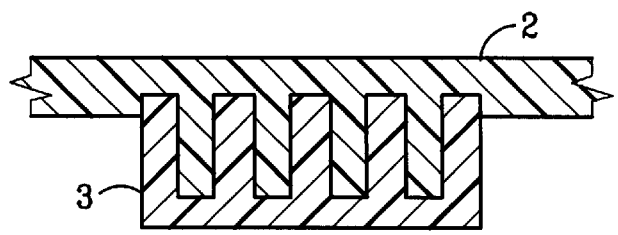
FIG. 20 illustrates an sixth representative design for attaching the adjoining portion of the reinforcing rib to the window body.
Figure 21:
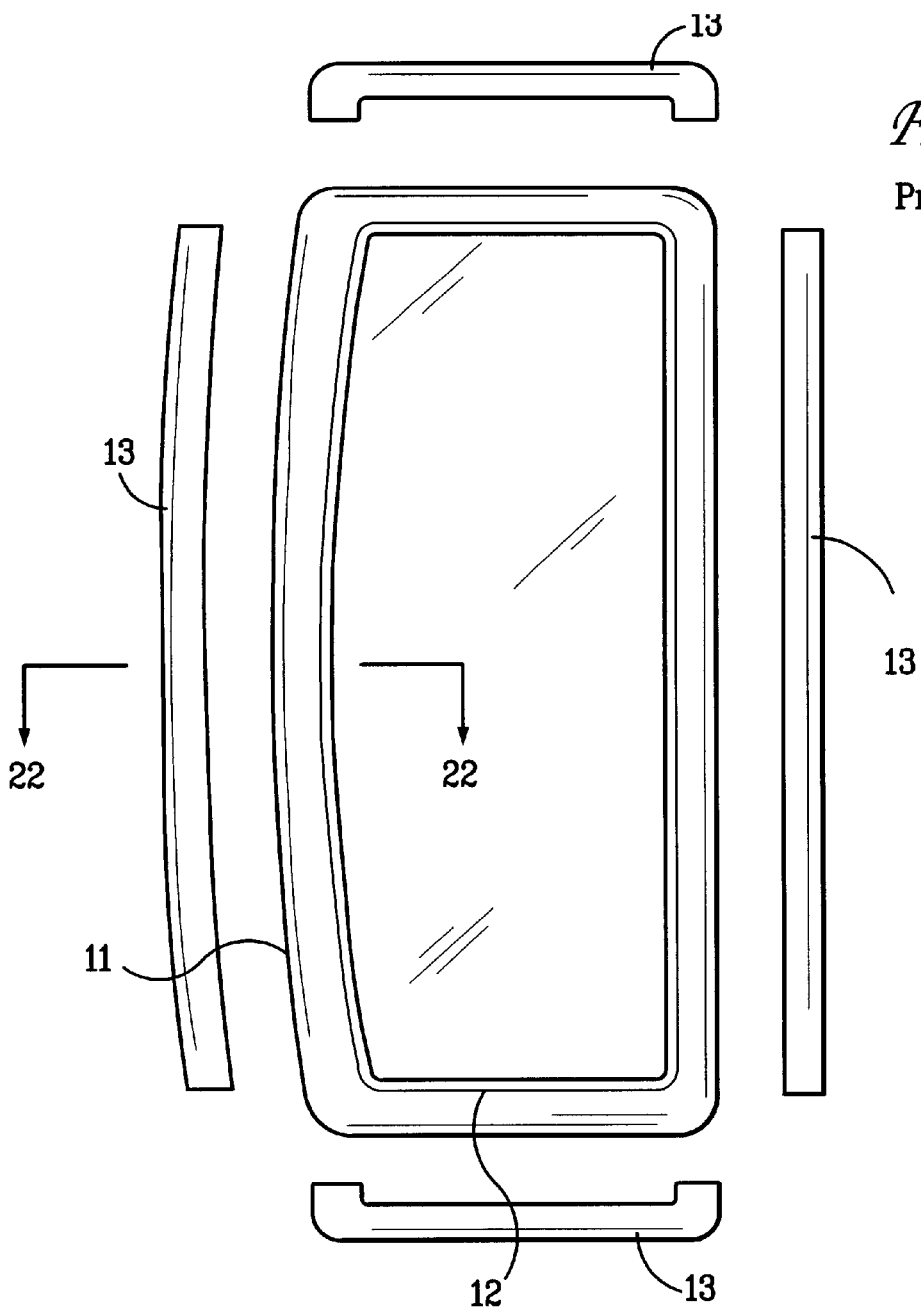
FIG. 21 is a top view of a known sunroof.
Figure 22:
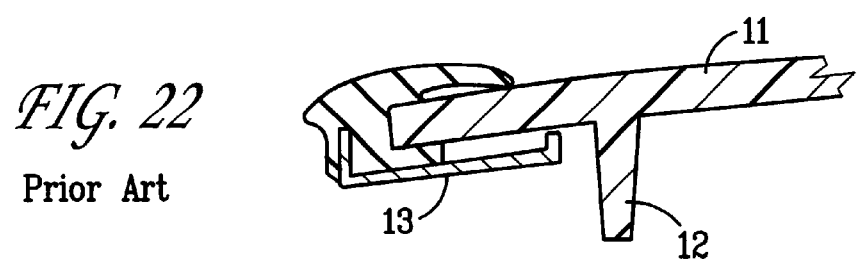
FIG. 22 is a cross sectional view along the line 22—22 shown in FIG. 21.

FIGS. 10 through 20 illustrate an further representative examples of preferred adjoining portions that can be utilized to connect the two components of the resin molded object using the double-molding techniques described herein. FIG. 10 shows the adjoining portion of the reinforcing rib 3 embedded in the window body 2 using a simple square design. FIG. 11 shows the reinforcing rib 3 embedded in the window body 2 using a square design in which the edges of the window body 2 are designed to wrap around the reinforcing rib. FIG. 12 shows an alternative embodiment of FIG. 11 in which the reinforcing rib 3 is embedded more deeply in the window body 2. FIG. 13 shows a window body 2 having a small protrusion in which the reinforcing rib 3 surrounds this protrusion. FIG. 14 shows a variation of FIG. 13 in which the reinforcing rib 3 is embedded in the window body 2. FIG. 15 illustrates another variation of the structure shown in FIG. 13 in which the reinforcing rib 3 forms a smooth edge structure around the protrusion of the window body 2. FIG. 16 illustrates a variation of the structures shown in FIGS. 14 and 15 in which the reinforcing member 3 has a smooth surface and is embedded within the window body 2. FIG. 17 illustrates a mutual contact structure in which the walls of a thin structure protruding from the window body 2 contact the reinforcing rib 3. FIG. 18 shows a variation of FIG. 17 in which the reinforcing rib 3 is embedded within the window body 2. FIG. 19 shows an L-shaped reinforcing rib 3 that is in flush contact with the window body 2 and embedded therein. FIG. 20 illustrates a repeated structure that is similar to the structure of FIG. 14 in which a plurality of protruded portions are disposed side by side. Such a repeated structure provides a strong bond that increases the rigidity of the window body and has an appealing appearance.

These designs are not intended to limit the types of attaching structures that can be utilized to construct double-injection molded resin molded objects. For example, a member that continuously or partially protrudes from the back of the object body, such as a mounting boss, can be provided to mount an object to the object body or to mount the object body itself.

Although the preferred resin molded objects are used as window structures in a sunroof of a car, other applications of the present invention are possible. For example, the present teachings may be utilized to construct other car windows, such as rear quarter windows, rear windows, side windows, etc., or other resin molded objects of a car such as a spoiler and a lamp cover. Further resin-molded objects can be prepared for non-car applications, such as motorcycles, boats, homes, etc. In short, the present teachings may be utilized to prepare any resin-molded object that would benefit from a reinforcing structure. And the present techniques can be utilized to avoid the generation sink marks that afflict known injection-molding techniques.

As described above in detail, the present invention provides an improved reinforced resin-molded object. In addition, a preferred aspect of the present invention is the elimination of sink marks in the resin molded objects. In further preferred aspects, methods for molding the resin molded object with no sink marks are taught using a variety of sets of dies that are effective in the molding of the resin molded object without sink marks. Thus, by utilizing the present teachings, the generation of sink marks can be prevented in each molding process, because the object body and the protruded member are molded separately. In other words, when the object body is molded, it is possible to obtain the same effect as that obtained when only the object body is molded, regardless of whether the molding is performed before or after the protruded member is molded. Thus, unlike the known art in which both the object body and the protruded member are formed at the same time in a single molding process, the present techniques can prevent the generation of sink marks with certainty, if desired.

Furthermore, since the molding process is divided into two steps, the object body and the protruded member can be formed either with the same material or with different materials. For example, the object body can be formed with a transparent material and the protruded member can be formed with a material including a reinforcing agent or an opaque material.

In this case, part of the object body or the protruded member formed in the first molding process may preferably be formed so as to be wrapped by the remainder (body or protruded member) formed in the second molding process. Since the first molded piece is held in the second molded piece due to shrinkage in curing, the connecting strength is improved significantly.

What is claimed is:

1. A window comprising:
   a resin window body having a first surface and a second surface that is substantially parallel to the first surface; and
   a resin reinforcing rib comprising a substantially elongated body having a first end and a second end that is opposite the first end, wherein the first end of the resin reinforcing rib is embedded within the resin window body and is integrally disposed between the first and the second surfaces of the resin window body and the substantially elongated body extends substantially perpendicularly from the second surface of the resin window body.

2. A window as in claim 1, wherein the resin reinforcing rib has a color that is different from the resin window body.

3. A window as in claim 2, wherein the resin reinforcing rib comprises a pigment.

4. A window as in claim 3, wherein the resin window body is substantially transparent and the resin reinforcing rib is at least partially opaque.

5. A window as in claim 1, wherein the first end of the resin reinforcing rib comprises a rib base that is wider than the elongated body and the rib base is substantially perpendicular to the elongated body.

6. A window as in claim 5, wherein the rib base comprises a first surface and a second surface that is substantially parallel to the first surface, the first surface of the rib base being embedded within the resin window body and the second surface of the rib base being substantially flush with the second surface of the resin window body.

7. A window as in claim 6, wherein the resin window body further comprises at least one outer peripheral edge that is substantially perpendicular to the first and the second surfaces of the resin window body and the rib base further comprises at least one outer peripheral edge that is substantially perpendicular to the first and the second surfaces of the rib base, the at least one outer peripheral edge of the resin window body being substantially flush with that at least one outer peripheral edge of the rib base.

8. A window as in claim 7, wherein the resin reinforcing rib has a color that is different from the resin window body.

9. A window as in claim 8, wherein the resin reinforcing rib comprises a pigment.

10. A window as in claim 9, wherein the resin window body is substantially transparent and the resin reinforcing rib is opaque.

11. A window as in claim 1, wherein the first end of the resin reinforcing rib comprises a rib base that is substantially perpendicular to the elongated body and forms an L-shape with the substantially elongated body, the rib base comprising a first surface and a second surface that is substantially parallel to the first surface, the first surface of the rib base being embedded within the resin window body and the second surface of the rib base being substantially flush with the second surface of the resin window body.

12. A window as in claim 11, wherein the resin reinforcing rib has a color that is different from the resin window body.

13. A window as in claim 12, wherein the resin reinforcing rib comprises a pigment.

14. A window as in claim 13, wherein the resin window body is substantially transparent and the resin reinforcing rib is at least partially opaque.

15. A window as in claim 11, wherein the resin window body further comprises at least one outer peripheral edge that is substantially perpendicular to the first and the second surfaces of the resin window body and the rib base further comprises at least one outer peripheral edge that is substantially perpendicular to the first and second surfaces of the rib base, the at least one outer peripheral edge of the resin window body being substantially flush with the at least one outer peripheral edge of the rib base.

16. A window as in claim 1, wherein the resin window body further comprises a protrusion extending substantially perpendicularly from the second surface of the resin window body, and the reinforcing rib is substantially U shaped and comprises two substantially parallel elongated bodies connected by a connecting portion, the two substantially parallel elongated bodies each comprising a first end that is embedded within and integrally disposed between the first and the second surfaces of the resin window body, the two substantially elongated bodies extending substantially perpendicularly from the second surface of the resin window body, and the resin window body protrusion being disposed between the two substantially elongated bodies.

17. A window as in claim 1, wherein the resin window body comprises a plurality of elongated protrusions that extend substantially perpendicularly from the second surface of the resin window body and a plurality of reinforcing ribs disposed between the plurality of resin window body protrusions and integrally contacting the plurality of resin window body protrusions, the plurality of reinforcing ribs being connected by a connecting portion.

18. A window comprising:
   a resin window body having a first surface and a second surface that is substantially parallel to the first surface; and
   a resin reinforcing rib comprising:
      a substantially elongated body having a first end and a second end opposite the first end, the substantially elongated body extending substantially perpendicularly from the second surface of the resin window body; and
      a rib base that is substantially perpendicular to the substantially elongated body and forms an L-shape with the elongated body, the rib base comprising a first surface and a second surface that is substantially parallel to the first surface, wherein the first surface of the rib base is embedded within the resin window body and integrally disposed between the first and the second surfaces of the resin window body and the second surface of the rib base is substantially flush with the second surface of the resin window body.

19. A window as in claim 18, wherein the resin reinforcing rib has a color that is different from the resin window body.

20. A window as in claim 19, wherein the resin reinforcing rib comprises a pigment.

21. A window as in claim 20, wherein the resin window body is substantially transparent and the resin reinforcing rib is at least partially opaque.

22. A window as in claim 18, wherein the resin window body further comprises at least one outer peripheral edge that is substantially perpendicular to the first and the second surfaces of the resin window body and the rib base further comprises at least one outer peripheral edge that is substantially perpendicular to the first and the second surfaces of the rib base, the at least one outer peripheral edge of the resin window body being substantially flush with the at least one outer peripheral edge of the rib base.

23. A window as in claim 22, wherein the resin window body is substantially transparent and the resin reinforcing rib is at least partially opaque.

* * * * *